US011394792B2

(12) United States Patent
Al Majid et al.

(10) Patent No.: US 11,394,792 B2
(45) Date of Patent: Jul. 19, 2022

(54) CONTEXT SURFACING IN COLLECTIONS

(71) Applicant: Snap Inc., Santa Monica, CA (US)

(72) Inventors: Newar Husam Al Majid, New York, NY (US); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/949,327

(22) Filed: Oct. 26, 2020

(65) Prior Publication Data

US 2022/0131948 A1    Apr. 28, 2022

(51) Int. Cl.
*G06F 3/0481* (2022.01)
*H04L 67/54* (2022.01)
*H04L 51/42* (2022.01)

(52) U.S. Cl.
CPC .......... *H04L 67/24* (2013.01); *G06F 3/0481* (2013.01); *H04L 51/22* (2013.01)

(58) Field of Classification Search
CPC .. G06F 3/0481; G06F 3/04817; G06F 3/0482; G06F 16/54; G06F 16/58; G06F 16/907; H04L 67/24; H04L 51/22
See application file for complete search history.

(56) References Cited

U.S. PATENT DOCUMENTS

| | | | |
|---|---|---|---|
| 6,804,684 B2* | 10/2004 | Stubler | G06F 16/58 |
| 9,396,354 B1* | 7/2016 | Murphy | H04L 51/10 |
| 10,331,750 B2* | 6/2019 | Choi | G06F 16/48 |
| 10,664,524 B2* | 5/2020 | Sarkar | G06F 16/7867 |
| 2008/0127256 A1* | 5/2008 | Hallam | G06Q 30/02 725/38 |
| 2011/0078714 A1* | 3/2011 | Sagayaraj | G06Q 30/06 725/5 |
| 2013/0219301 A1 | 8/2013 | Cheng et al. | |
| 2013/0239021 A1 | 9/2013 | Feinberg et al. | |
| 2018/0083906 A1 | 3/2018 | Jayaram et al. | |
| 2018/0367484 A1 | 12/2018 | Rodriguez et al. | |
| 2021/0126883 A1* | 4/2021 | Choi | G06F 3/04817 |

OTHER PUBLICATIONS

"Surprise!", [Online] Retrieved from the Internet: <URL: https://www.snap.com/en-US/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

(Continued)

*Primary Examiner* — Alvin H Tan
(74) *Attorney, Agent, or Firm* — Schwegman Lundberg & Woessner, P.A.

(57) ABSTRACT

A messaging system, which hosts a backend service for an associated messaging client, includes a context surfacing system that provides context surfacing functionality in collections. The context surfacing system is configured to surface information representing a context object associated with a collection as a context string in a cell that represents the collection in a collections user interface. A cell that represents the collection in a collections user interface is actionable to cause presentation of the set of media content items in the collection on a display device of the viewer.

18 Claims, 9 Drawing Sheets

(56) References Cited

OTHER PUBLICATIONS

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

"International Application Serial No. PCT/US2021/056557, International Search Report dated Feb. 16, 2022", 3 pgs.

"International Application Serial No. PCT/US2021/056557, Written Opinion dated Feb. 16, 2022", 4 pgs.

* cited by examiner

CONTEXT SURFACING IN COLLECTIONS

TECHNICAL FIELD

The present disclosure relates generally to facilitating interactions between client devices over a network.

BACKGROUND

The popularity of computer-implemented tools that permit users to access and interact with content and other users online continues to grow. For example, various computer-implemented tools exist that permit users to interact and share content with other users through messaging applications. Some of such computer-implemented tools, termed applications or apps, can be designed to run on a mobile device such as a phone, a tablet, or a watch.

A messaging app, for example, facilitates communication and data exchange between users and may also permit users to create a collection of content items captured by a camera. A reference to a collection is presented on a designated user interface (UI) screen and can include the name of a user who created the collection and a reduced size version of the user's profile picture. The viewing user can access the content in a collection (e.g., video clips and/or images that may be accompanied by sound clips, animation and captions) by tapping on the reference to the collection.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
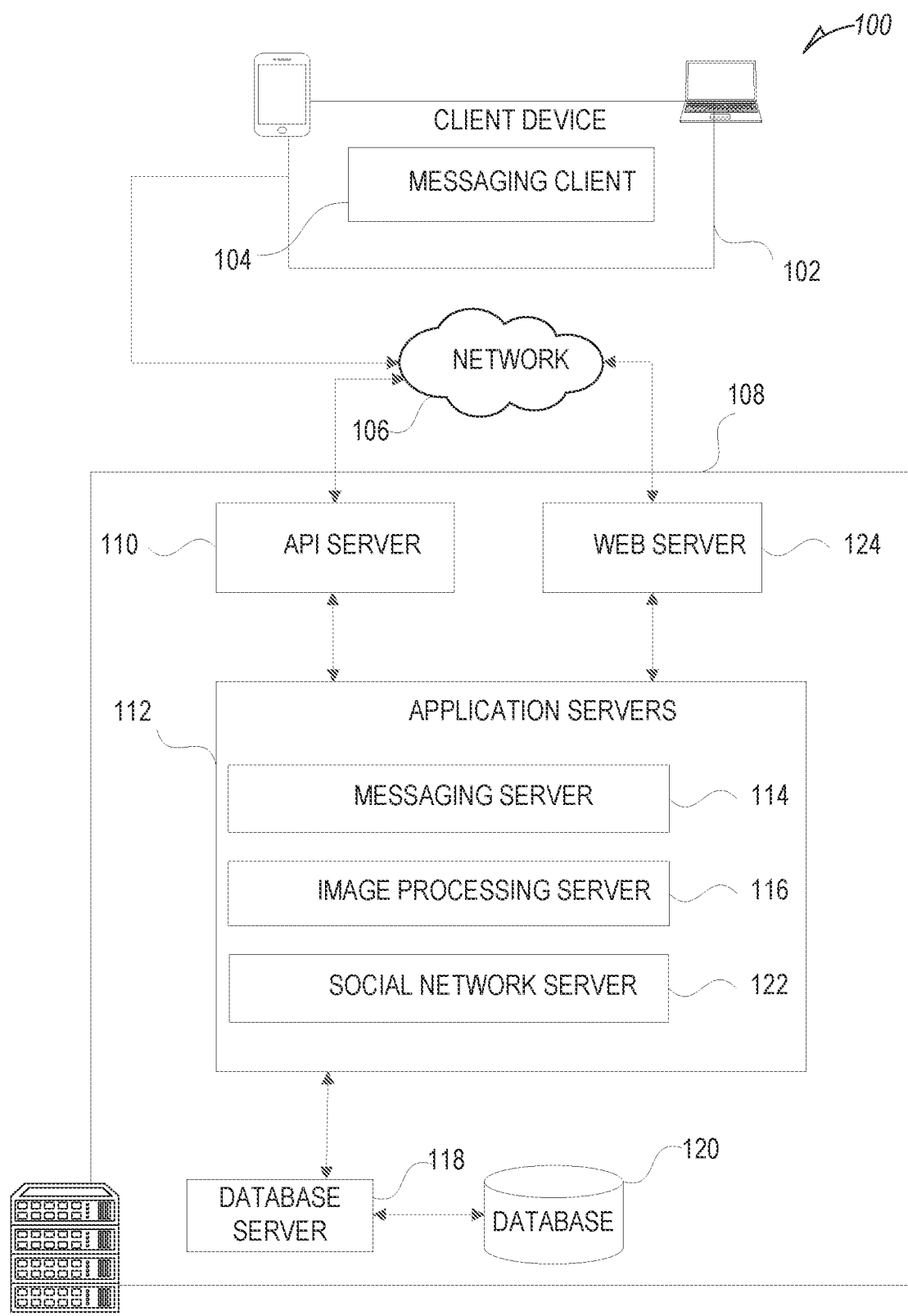
FIG. 1 is a diagrammatic representation of a networked environment in which the present disclosure may be deployed, in accordance with some examples.

In a messaging system that hosts a backend service for an associated messaging client, the content items captured by a camera may be aggregated into collections. A collection can be activated to cause the content items in the collection to be presented on a display device, where the content items are displayed automatically one after another, each for a predetermined period of time. An item in a collection includes content captured by a camera (an image or a video) and can also have additional content, such as a caption, an overlaid image (static or animated), an audio clip, or an interactive tool. For the purposes of this description, content captured by a camera included in an item in a collection is referred to as the main content. Content included in an item in a collection, which is in addition to the main content (e.g., a caption, an overlaid image, an audio clip, or an interactive tool), as well as various metadata associated with an item in the collection or with the entire collection is referred to as context or context objects associated with the collection. For example, an item in a collection that has a photo of a person at a sports event as the main content may also include a context object, which is an animated image of a cheering cartoon character overlaid over the photo and/or another context object, which is a caption reading "GO TEAM!", Another example of context is information indicating the use of one or more tools, such as an augmented reality component, in generating an item in the collection. For example, if an item in the collection is an image captured by a camera using an augmented reality component that adds dog ears to the person in the image, the associated context object may be an identification of that augmented reality component. Yet another example of context is information indicative of a state of the client device operated by the user who created the collection, e.g., low battery state or a state indicating the geographic location of the client device.

While a collection may include not only the captured images and video, but also diverse and interesting context, making a collection available for viewing in the messaging system by identifying, in a cell referencing the collection, merely the person who created the collection (collection owner) may not be sufficient for a potential viewer to determine whether the collection contains information that may be of interest (e.g., an interesting image with a clever caption) or of use (e.g., an interactive tool or information about the) to them. Furthermore, while a collection item may include an actionable context object, e.g., an interactive tool, that can be activated by a viewer during the presentation of the collection item for a predetermined period of time, the viewer may forget to or not have enough time to take action while viewing the collection item. The technical problem of enhancing usability and utility of collections is addressed by including, with the messaging system, a context surfacing system.

The context surfacing system is configured to surface information representing a context object associated with a collection as a context string in a cell that represents the collection in a collections user interface. A cell that represents the collection in a collections user interface is actionable to cause presentation of the set of media content items in the collection on a display device of the viewer. Surfacing information representing a context object associated with a collection permits potential viewers to make a more informed decision about whether to activate the collection and watch the presentation of the associated set of media content items. For the purposes of this description, the context string included in a cell representing a collection may be referred to as subtext, and the context object used to generate the context string may be referred to as a subtext trigger.

The context surfacing system may be also configured to surface a context object as a user-selectable element in a cell that represents a collection, that was previously viewed by a viewer, on a collections user interface presented on a display device of the viewer. A context object used to generate a user-selectable element in a cell that represents a previously viewed collection may be termed a post view trigger. A post view trigger may be an actionable context object, such as an interactive tool. An interactive tool included in an item from a collection is a user-selectable element actionable to effectuate an action from within that item. An example of an interactive tool is a user-selectable element that can be activated to initiate a game session for the viewer of the associated collection. Another example of an interactive tool is a visual control actionable to unlock an augmented reality component for the viewer of a collection. In some examples, a context object that is not a user-selectable element that can be activated by a viewer during the presentation of the collection item may be designated in the subtext surfacing system as a post view trigger. For example, a context object in a collection may reference a user who is not connected, in the messaging system, to the viewer of the associated collection Such context object may be designated in the subtext surfacing system as a post view trigger, which results in including, in a cell that represents the collection after it has been viewed, a user-selectable element that can be activated to request that a profile of the user who is not connected to the viewer is designated in a profile representing the viewer in the messaging system as a connection of the user and that the profile of the viewer is designated as a connection in the profile representing the user. The context surfacing system may select, for generating a post-view user-selectable element, a context object that is associated with an item most recently added to the collection or a post view trigger that is associated with any other item in the collection.

The context surfacing system may be configured to include, in a cell representing a collection, a single context string, even when multiple context objects associated with the collection could be used to generate respective informative context strings. The context surfacing system may be configured to use a context object from the content item in the collection that was most recently added to the collection. Furthermore, additionally or alternatively, context objects may be assigned respective predetermined categories or types. For example, a context object, which is included in a content item in a collection in addition to the main content, such as a caption or an effect produced by an augmented reality component, may be assigned a first type, while a context object that is metadata indicating the state of the client device of the user who created the collection, may be assigned a second type. These types may be assigned different priority values that can be used to determine which context object is to be used for generating the context string to be included in the cell representing the collection in the collections user interface. Context objects of the same type can be prioritized based on a predetermined ranking of the context objects of that type. In some examples, the context surfacing system selects a context object for surfacing in a collections interface, as a subtext or as a post view user-selectable element, based on the priority value assigned to the type of the context object.

While the content items in a collection are displayed to a viewer automatically, one after another, each for a predetermined period of time, the collection itself may be configured to become unavailable for viewing after a predetermined period of time, e.g., after 24 hours. As explained above, the cell representing the collection comprises the context string that provides information about the collection or about one or more of the items in the collection, in addition to information identifying the person who created the collection. In some examples, a cell representing a collection includes a reduced image (a thumbnail) of the most recently added content item from the collection, and, the context string represents a context object associated with the most recently added content item from the collection. A cell representing a collection may include an indication of a remaining time period, within which a user can view the collection, e.g., how many hours are remaining in the least recent content item in the collection. In some examples, an indication of a remaining time period for viewing the collection, relative to the entire period within which a collection is available for access (e.g., 24 hours), is in the form of a ring displayed around the thumbnail of the most recently added content item from the collection, with 24 hours represented by the 360 degrees of the ring. The time ring shows the portion of the time period, within which a user can still view the collection, by expiring in a clockwise fashion, the expired time period indicated by a color or shade of the ring that is different from the color indicating the remaining time period.

Networked Computing Environment

FIG. 1 is a block diagram showing an example messaging system 100 for exchanging data (e.g., messages and associated content) over a network, within which a context surfacing system can be implemented. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is can communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
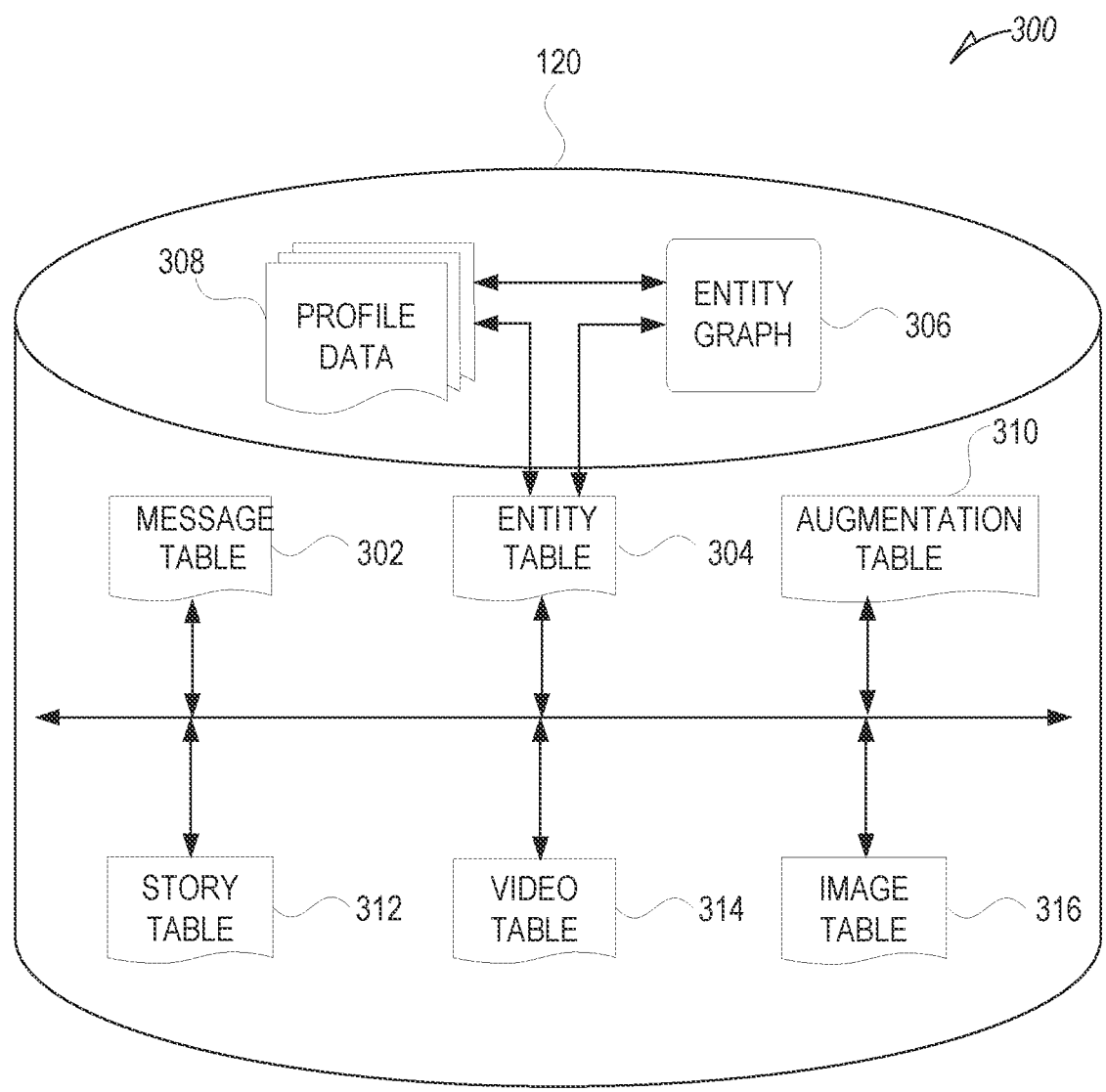
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

The application servers 112 and at the messaging client 104 perform various functions of the context surfacing system. For example, the aggregation of the media content items from multiple sources into a collection may be performed by the application servers 112, so that the collection can then made available to the messaging client 104 via a collections user interface. The collections user interface, which is described further below with reference to FIG. 7 and FIG. 8, can be generated by the applications servers 112 and/or by the messaging client 104. As explained above, an example collections user interface displays cells that reference respective collections. A cell, or a user-selectable element provided within a cell, is actionable to activate the collection and to cause the content items in the collection to be displayed automatically one after another, each for a predetermined period of time (e.g., one or more seconds). A collection may be configured to expire, to become no longer available for access by users, after a predetermined period of time, e.g., after 24 hours. An example collections user interface illustrating a cell with subtext, representing a collection not yet viewed by a user is described further below with reference to FIG. 7, which is described further below. FIG. 8, which is described further below, illustrates a cell representing a previously viewed collection, where the cell includes a post view user selectable element.

System Architecture

Figure 2:
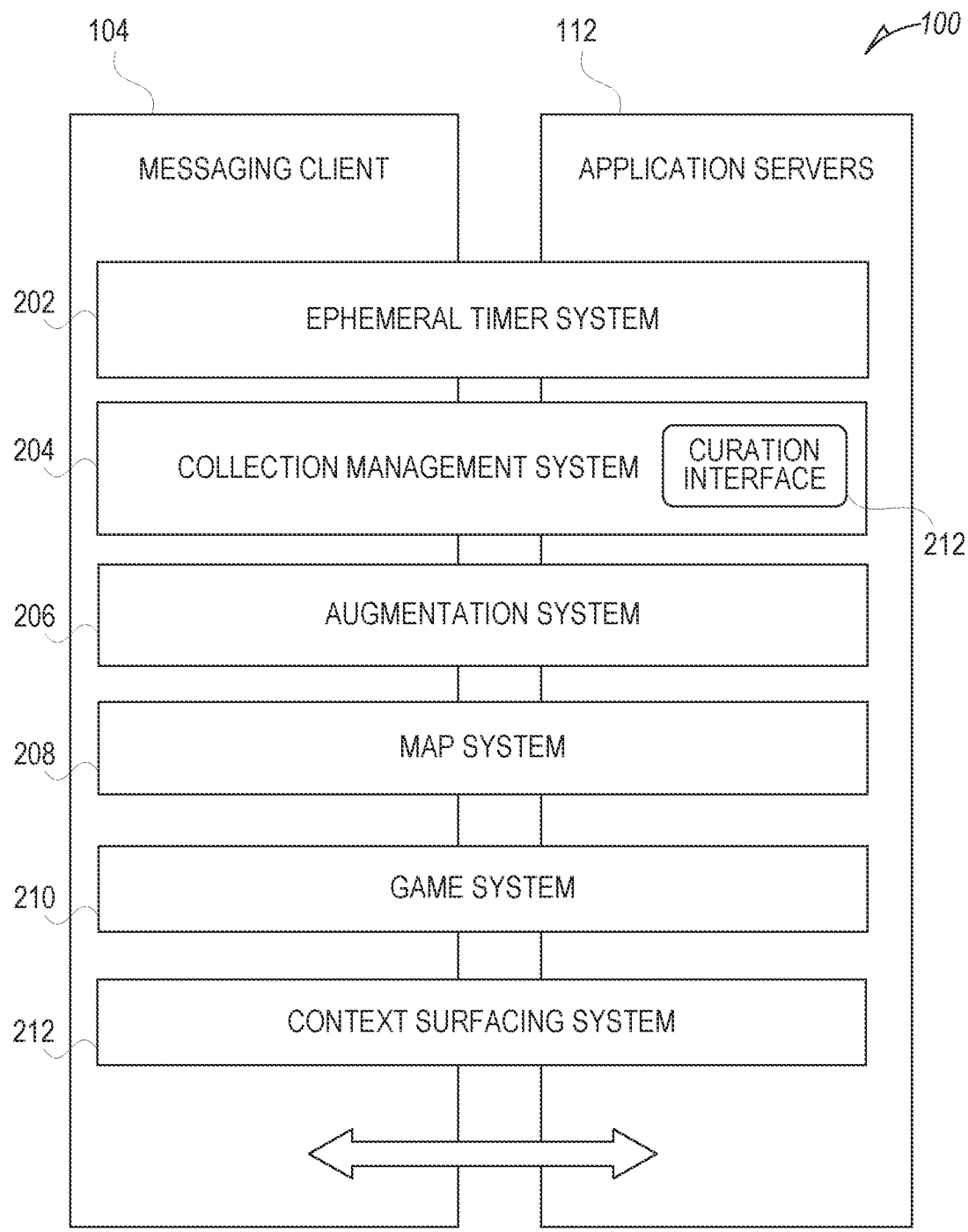
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the sever-side by the application servers 112. These subsystems include, for example, an ephemeral timer system 202, a collection management system 204, an augmentation system 206, and a game system 210.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. For example, one or more timers in the ephemeral timer system 202 enables access to collections comprising respective sets of media content items for a specified time period, e.g., for 24 hours, or for a duration of an event, e.g., a sports event or a music concert, to which the content relates. Further details regarding the operation of the ephemeral timer system 202 are provided below.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102, in another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. The media overlays may be stored in the database 120 and accessed through the database server 118. The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards.

The collection management system 204 is responsible for managing sets or collections of media (e.g., collections of text, image video, and audio data). Such a collection may be made available for a specified time period, e.g., for 24 hours, or for a duration of an event to which the content relates. For example, content relating to a music concert may be made available as a "story" for the duration of that music concert. An indication of a remaining time period for viewing the collection may be provided in a collections user interface. In some examples, an indication of a remaining time period for viewing the collection, relative to the entire period within which a collection is available for access (e.g., 24 hours), is in the form of a ring displayed around the thumbnail of the most recently added content item from the collection, with 24 hours represented by the 360 degrees of the ring. The time ring shows the portion of the time period, within which a user can still view the collection, by expiring in a clockwise fashion, the expired time period indicated by a color or shade of the ring that is different from the color indicating the remaining time period. A collections user interface is generated by a context surfacing system 212.

The context surfacing system 212 is configured to cooperate with other systems shown in FIG. 2, specifically with the collection management system 204 and the ephemeral timer system 202. In some examples, the context surfacing system 212 may be part of the collection management system 204. As described above, the context surfacing system 212 is configured to surface information representing a context object associated with a collection in a cell that represents the collection in a collections user interface and that is actionable to cause presentation of the set of media content items in the collection on a display device of the viewer. The context surfacing system 212 may be also configured to surface a context object as a user-selectable element in a cell that represents a collection, that was previously viewed by a viewer, in a collections user interface presented on a display device of the viewer.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example; a user name, telephone number; address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316). Other augmentation data that may be stored within the image table 316 includes augmented reality content items (e.g., corresponding to applying Lenses or augmented reality experiences). An augmented reality content item may be a real-time special effect and sound that may be added to an image or a video.

A story table 312 stores data regarding collections of messages and associated image, video, or audio data; which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story. The data regarding image, video, or audio data, which are compiled into a collection may include data associated with the context objects, such as respective types of the context objects, respective substrings associated with the context objects, if any, and the respective post view actions associated with the context objects, if any. Examples of context objects and their respective types of the context objects, respective sub strings associated with the context objects, if any, and the respective post view actions associated with the context objects are shown in Table 1 below.

TABLE 1

| Context object (Subtext trigger) | Type | Context string (Subtext) | Post View Action |
|---|---|---|---|
| Caption | Tools | "Caption" | |
| Venue Filter | Tools | At Yankee Stadium | View Venue Profile |
| Game | Tools | Played a Game | Play Game |
| Group Call Overlay | Tools | Created a Group Call Invite | Join Group Call |
| Event Overlay | Tools | Created an Event Invite | Join Event |
| Poll Overlay | Tools | Created a Poll | Answer Poll |
| Attachment | Tools | Attached a Link | Open Link |
| Location indication | Tools | Heading to NYC | View on Map |
| Music | Tools | "Little Song" by Future | Play the song |
| Topic | Tools | #MambaForever | Contribute to Topic |
| Mention of a friend | Tools | Mentioned Jeremy Voss | |
| Mention of non-friend | Tools | Mentioned a Friend | Add Friend |
| Augmented reality component used | Tools | Augmented reality component Name | Load the Augmented reality component |
| Speed indication Overlay | Tools | 0 MPH | |
| Weather Overlay | Tools | 32° F. Thunderstorms | |
| from previously saved content | Messaging system | 2 months ago from Trip to Cartagena | |
| Map Status Post | Messaging system | Traveled to Woodland, WA | View on Map |
| Posting location while traveling | Messaging system | Traveling in Miami | View on Map |
| Low Battery | User Device | Battery running low | |

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective. A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
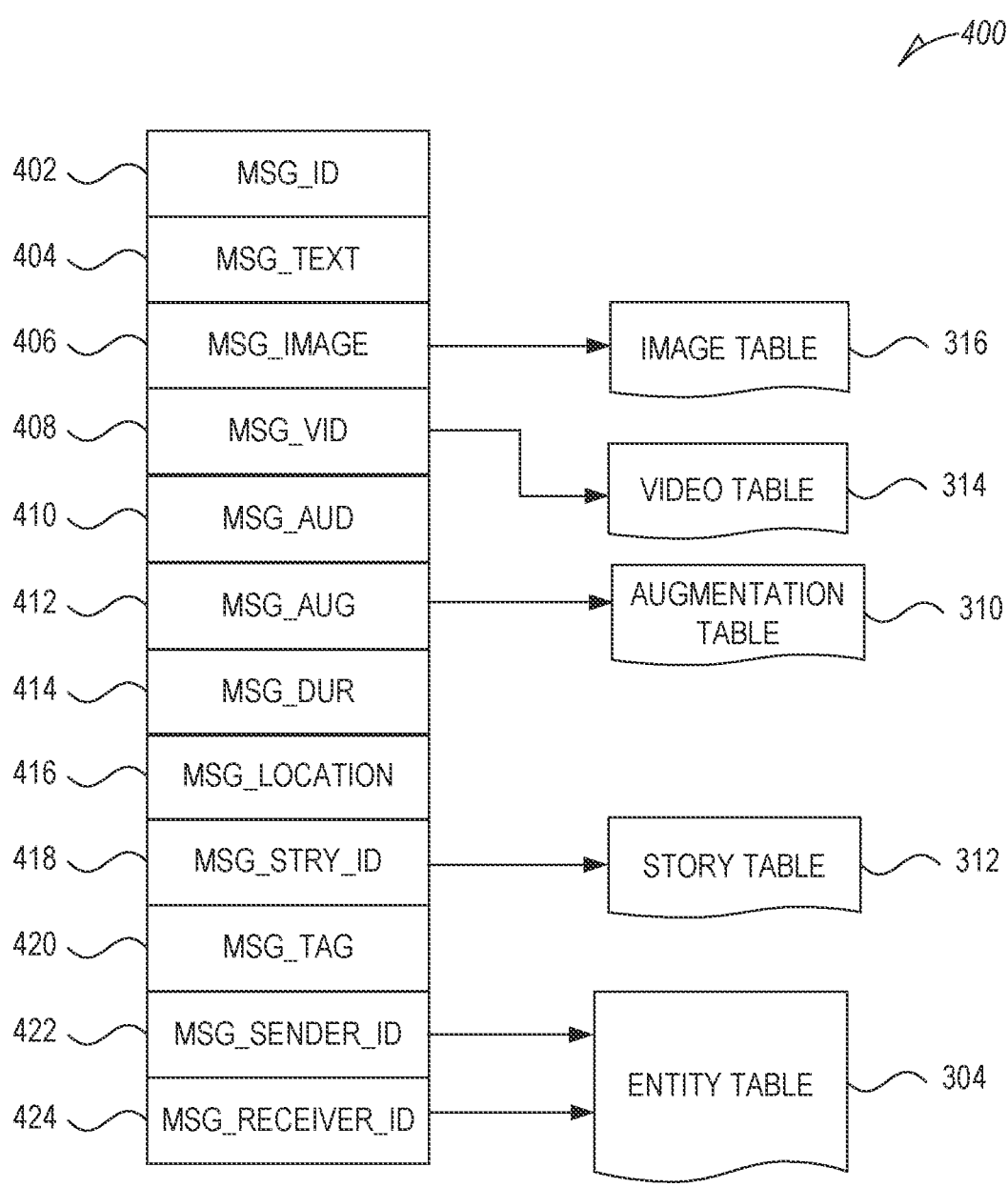
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400,
- message image payload 406: image data, captured by a camera component of a client device 102 or retrieved from a memory component of a client device 102, and that is included in the message 400, Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values, message tag 420: each message 400 may be tagged with multiple tags, each of which is indicative of the subject matter of content included in the message payload. For example, where a particular image included in the message image payload 406 depicts an animal a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
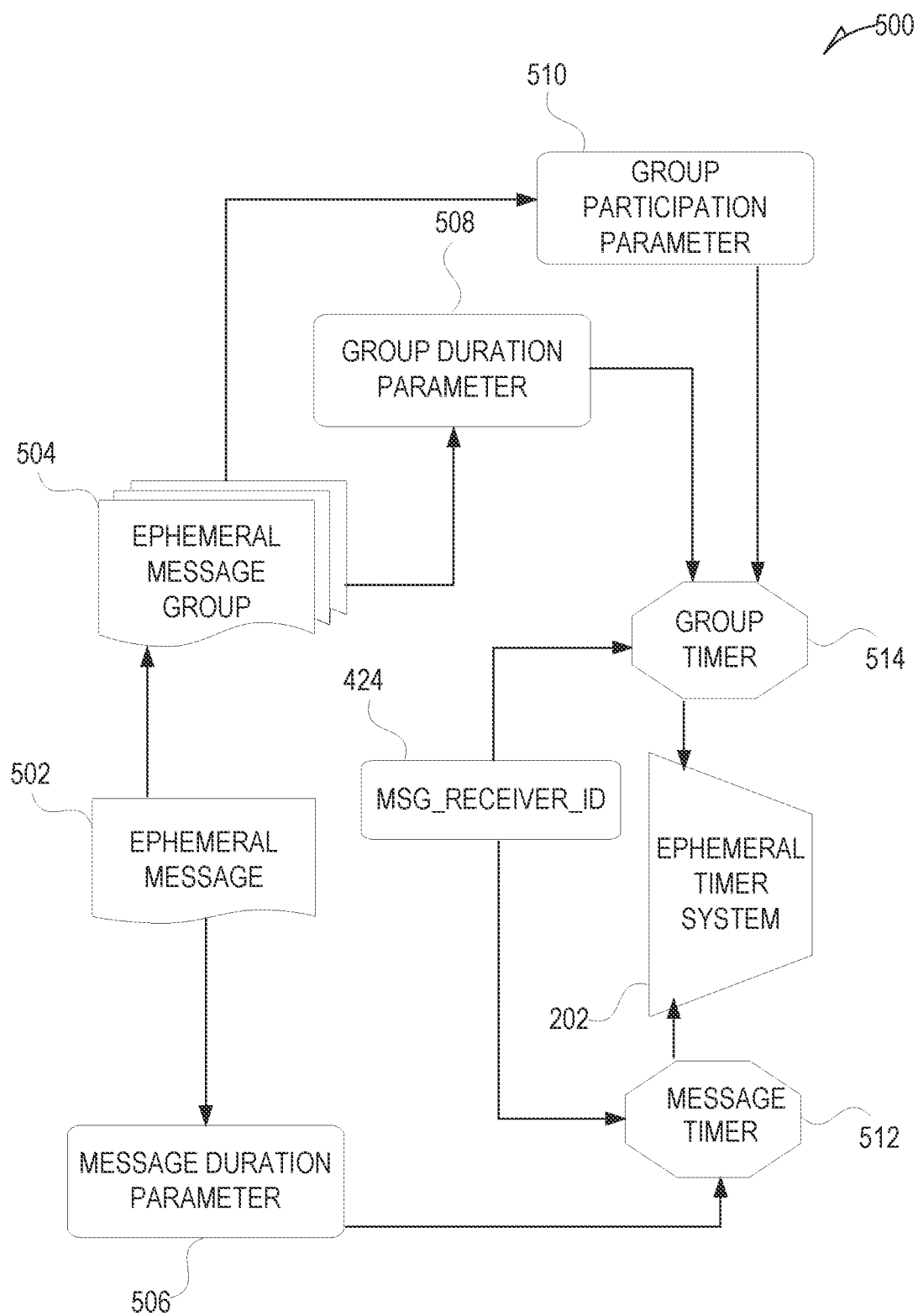
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is associated with an identification of a sending user (MSG_SENDER_ID 422 of FIG. 4) and is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506, The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of media content items in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be a predetermined amount of time, e.g., 24 hours.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504, In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

As mentioned above, where an ephemeral message group 504 is a collection of media content items, the messaging system may be configured to display, on a viewer's display device, an indication of a remaining time period, within which a user can still view the collection, e.g., how many hours are remaining in the least recent media content item in the collection. In some examples, an indication of a remaining time period for viewing the collection, relative to the entire period within which a collection is available for access (e.g., 2.4 hours), is in the form of a ring displayed around the thumbnail of the most recently added content item from the collection, with 24 hours represented by the 360 degrees of the ring. The time ring may show the portion of the time period, within which a user can still view the collection, by expiring in a clockwise fashion, the expired time period indicated by a color or shade of the ring that is different from the color indicating the remaining time period. The time ring may be generated by the context surfacing system 212 of FIG. 2, Example operations performed by the context surfacing system 212 of FIG. 2 are described below, with reference to FIG. 6.

Figure 6:
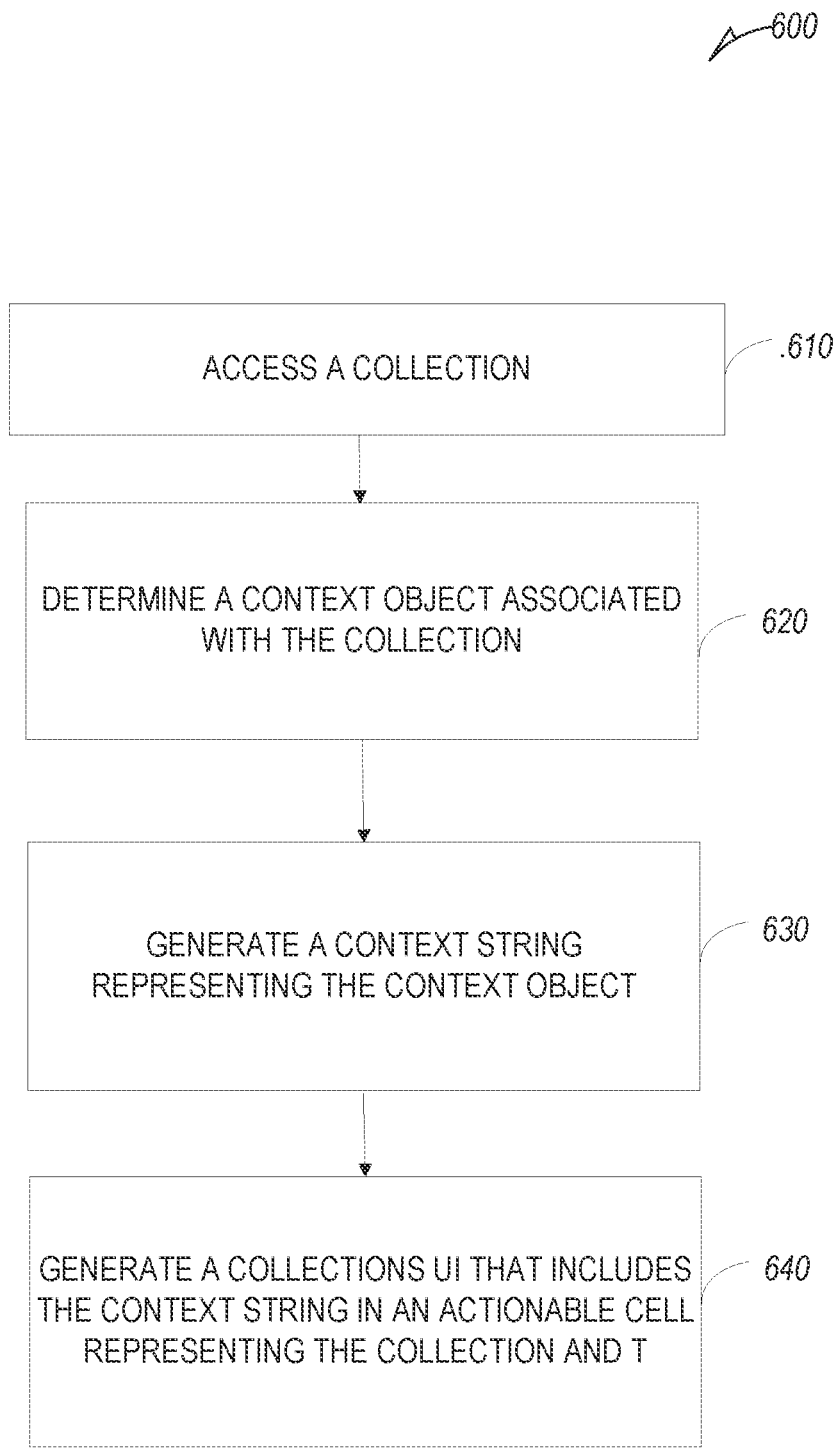
FIG. 6 is a flowchart of a method for facilitating context surfacing in collections, in accordance with some examples.

FIG. 6 is a flowchart of a method 600 for facilitating context surfacing in collections. The method 600 may be performed by processing logic that may comprise hardware (e.g., dedicated logic, programmable logic, microcode, etc.), software, or a combination of both. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

In one example embodiment, some or all processing logic resides at the client device 102 of FIG. 1 and/or at the messaging server system 108 of FIG. 1, The method 600 commences at operation 610, when the context surfacing system 212 of FIG. 2 accesses a collection created by a user. The collection comprises a set of media content items and is configured to cause displaying items in the set of media content items one after another, each for a predetermined period of time. At operation 620, the context surfacing system 212 determines a subtext trigger associated with the collection. The subtext trigger is distinct from items from the set of media content items and is also distinct from information identifying the user who created the collection. For example, the subtext trigger may be a caption included with an item in the set of media content items (e.g., "a view from my window this morning." As another example, the subtext trigger may indicate the state of the client device, such as a low battery state.

At operation 630, the context surfacing system 212 generates a context string representing the subtext trigger. At operation 640, the context surfacing system 212 generates a first collections user interface including a first cell representing the collection, where the first cell comprises the context string and is actionable to cause presentation of the set of media content items on a client device of a viewer.

Figure 7:
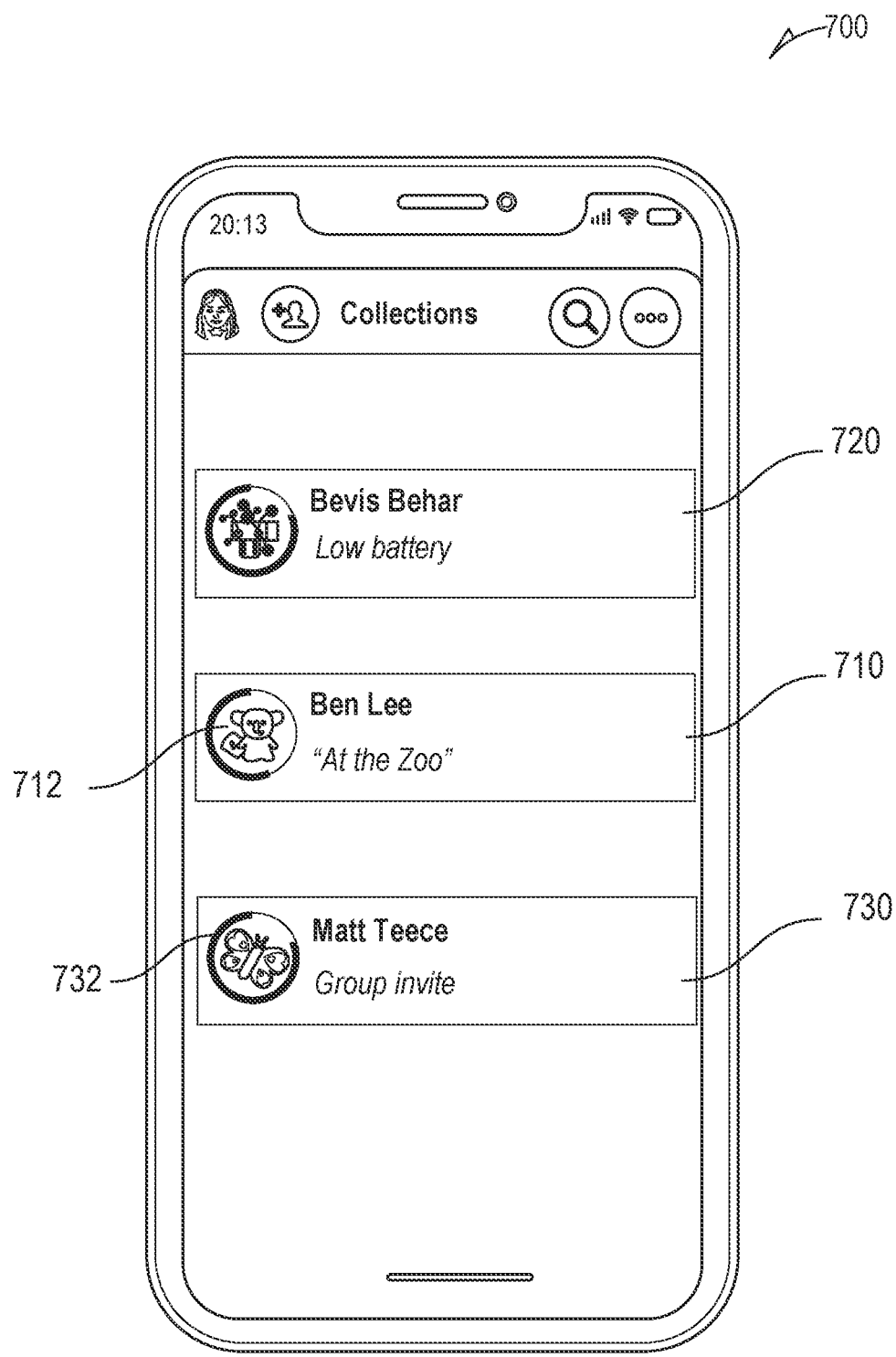
FIG. 7 is a diagram illustrating an example of a collections user interface.
Figure 8:
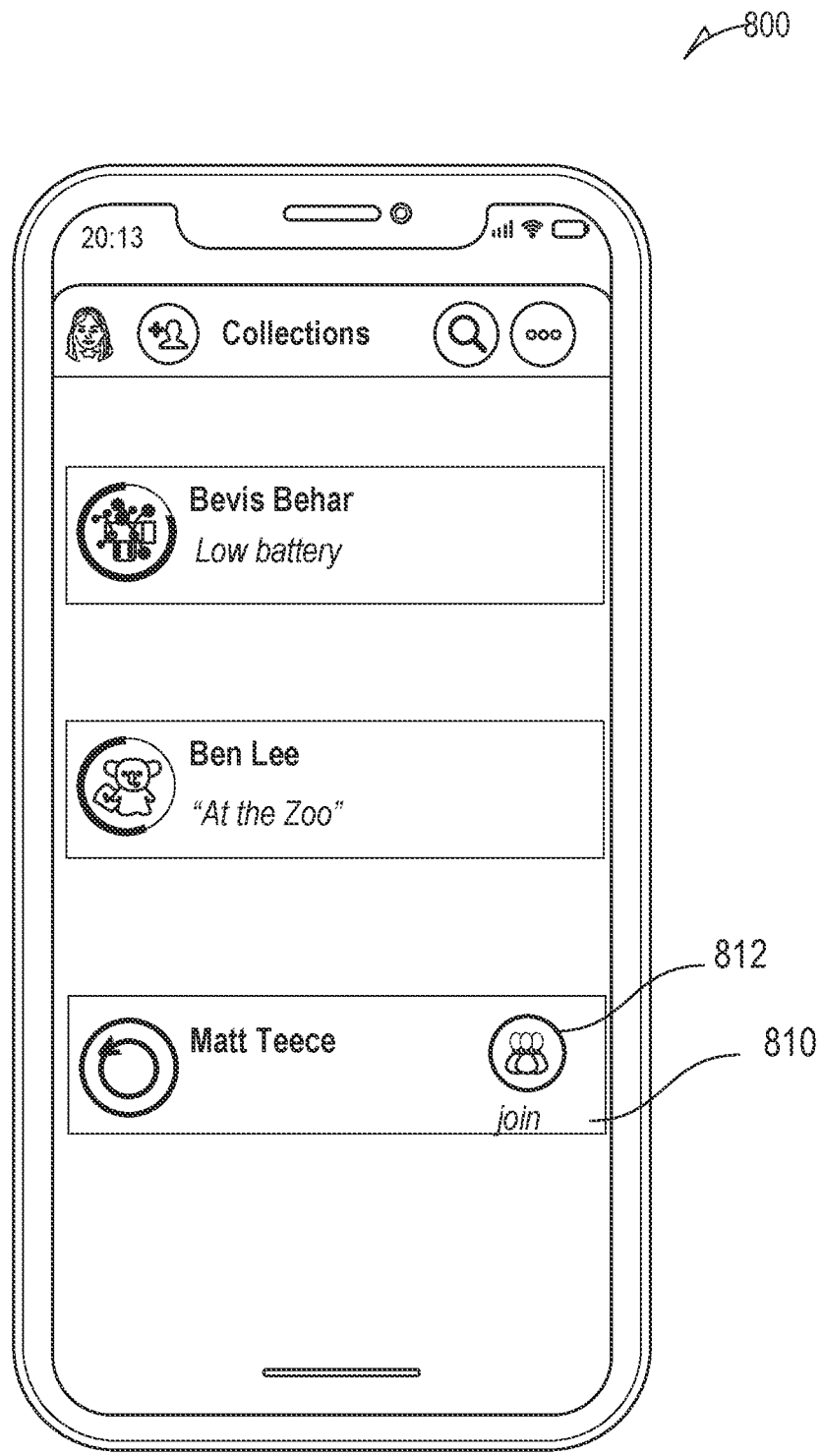
FIG. 8 is a diagram illustrating a further example of a collections user interface.

An example of a collections user interface 700 including a cell 710 representing the collection is shown in FIG. 7, The cell 710 includes information identifying the user who created the collection (here, "Ben Lee"), a thumbnail 712 of an item from the set of media content items included in the collection, and a context string "At the Zoo." In this example, the context string "At the Zoo" is created based on a subtext trigger, which is a caption in the item from the set of media content items that corresponds to the thumbnail 712 (it can be seen that the thumbnail 712 depicts an animal).

Also shown in FIG. 7 is a cell 720 that includes information identifying the user who created the associated collection (here, "Bevis Behar"), a thumbnail of an item from the set of media content items included in the collection, and a context string "Low battery." In this example, the context string "Low battery" is created based on a subtext trigger, which indicates the state of a client device of a user who created the associated collection.

Also shown in FIG. 7 is a cell 730 that includes information identifying the user who created the associated collection (here, "Matt Teece"), a thumbnail of an item from the set of media content items included in the collection, and a context string "Group invite." In this example, the context string "Group invite" is created based on a subtext trigger, which is associated with an interactive tool provided with an item corresponding to the thumbnail image. In this example, the interactive tool is a user-selectable element presented as part of a media content item in a collection indicating a proposed action for the viewer to join a particular group of users in the messaging system. Also shown in the cell 730 is a time ring, displayed around the thumbnail. The time ring shows the portion of the time period, within which a user can still view the collection. Here, the expired time period is indicated by a thicker line.

As discussed above, a context object representing an action in the messaging system, e.g., an interactive tool, can also be used to generate a post view user-selectable element and include it in a cell representing a previously viewed collection in a collections user interface. For example, a collections user interface 800 shown in FIG. 8 includes a cell 810 that represents the same collection as the cell 730 in FIG. 7. The collection is represented by the cell 810 after the viewer has viewed the collection. While in FIG. 7 the cell 730 includes the context string "Group invite," which is created based on a subtext trigger associated with an interactive tool presented as part of a media content item in a collection and indicating a proposed action for the viewer to join a particular group of users in the messaging system, the cell 810 in FIG. 8 includes a post view user-selectable element 812 is actionable to activate the interactive tool to request that the viewer joins the associated group in the messaging system.

Machine Architecture

Figure 9:
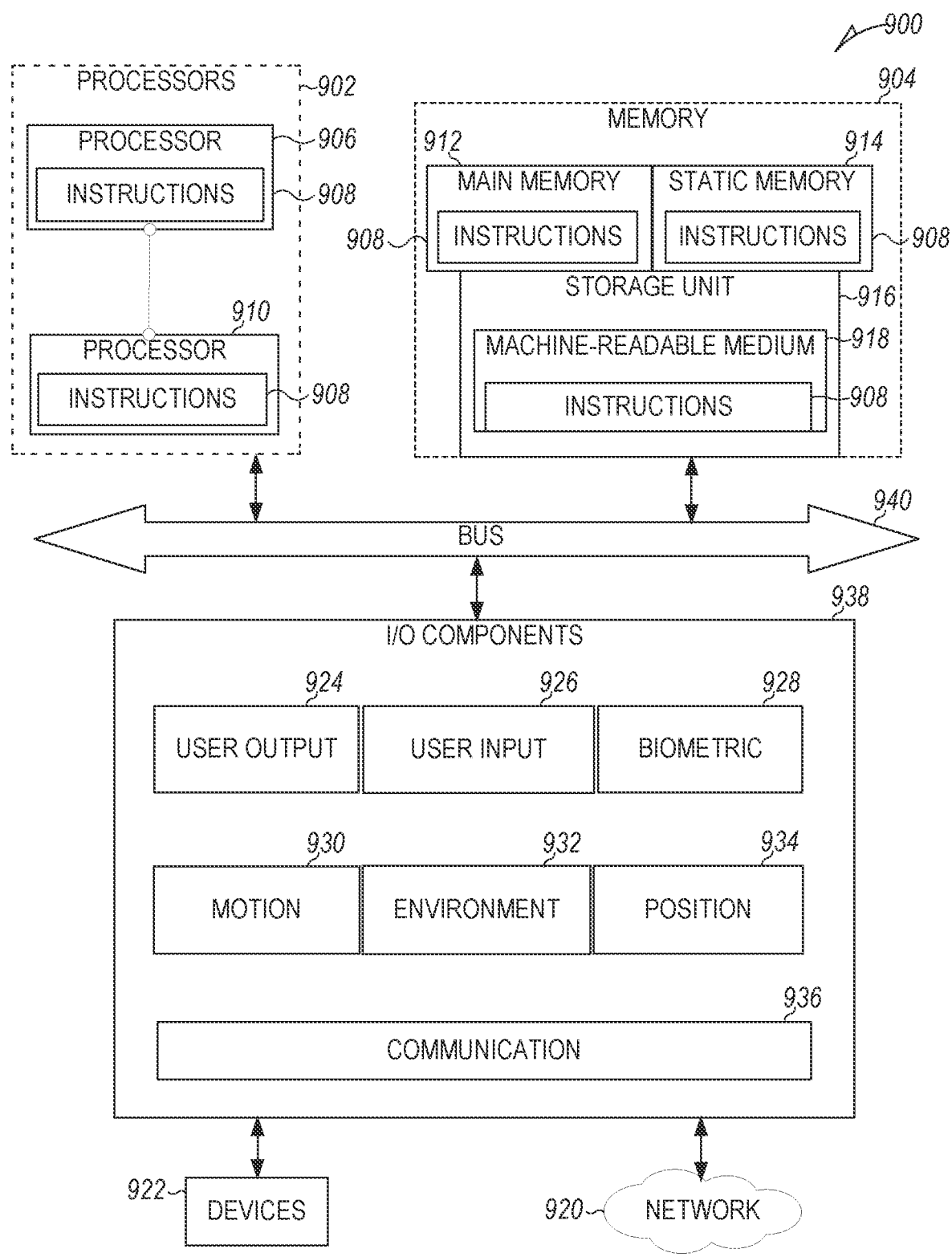
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 600 within which instructions 608 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output I/O components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 940. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 919, within at least one of the processors 902 (e.g., within the Processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface Component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), components, and other communication components to provide communication via other modalities. The devices 922 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by, processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 922.

Glossary

"Carrier signal" refers to any intangible medium that is capable of storing, encoding, or carrying instructions for execution by the machine, and includes digital or analog communications signals or other intangible media to facilitate communication of such instructions, Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data. Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein, Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time, Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   in a messaging system for exchanging data over a network, accessing a collection created by a user in the messaging system, the collection comprising a set of media content items, the collection configured to cause displaying items in the set of media content items one after another, each for a predetermined period of time;
   determining a subtext trigger associated with the collection, the subtext trigger being distinct from items from the set of media content items and distinct from information identifying the user, the subtext trigger associated with a proposed action for a viewer;
   based on the determined subtext trigger, generating a context string representing the subtext trigger and a user-selectable element representing the proposed action;
   generating a first collections user interface including a first cell representing the collection, the first cell comprising the context string, the first cell actionable to cause presentation of the set of media content items on a client device of the viewer; and
   in response to determining that the collection was previously accessed by the viewer, generating a second collections user interface including a second cell representing the collection, the second cell comprising the user-selectable element representing the proposed action.

2. The method of claim 1, wherein the subtext trigger is a caption included with an item in the set of media content items and the context string represents the caption.

3. The method of claim 1, wherein the subtext trigger indicates state of the client device.

4. The method of claim 1, wherein the subtext trigger indicates an augmented reality component and the context string represents an identification of the augmented reality component.

5. The method of claim 1, wherein the subtext trigger is an interactive tool included in an item from the set of media content items.

6. The method of claim 5, wherein the user-selectable element representing the action is actionable to activate the interactive tool.

7. The method of claim 1, wherein the first cell comprises a thumbnail of an image from the set of media content items and an indication of a remaining time period, within which the viewer can access the collection, the indication of the remaining time period is displayed as a partial ring around the thumbnail.

8. The method of claim 7, wherein the image is associated with a content item in the set of media content items that was most recently added to the collection.

9. The method of claim 1, wherein the items in the set of media content items comprise content captured by a camera.

10. A system comprising:
    one or more processors; and
    a non-transitory computer readable storage medium comprising instructions that when executed by the one or processors cause the one or more processors to perform operations comprising:
    in a messaging system for exchanging data over a network, accessing a collection created by a user in the messaging system, the collection comprising a set of media content items, the collection configured to cause displaying items in the set of media content items one after another, each for a predetermined period of time;
    determining a subtext trigger associated with the collection, the subtext trigger being distinct from items from the set of media content items and distinct from information identifying the user, the subtext trigger associated with a proposed action for a viewer;
    based on the determined subtext trigger, generating a context string representing the subtext trigger and a user-selectable element representing the proposed action;
    generating a first collections user interface including a first cell representing the collection, the first cell comprising the context string, the first cell actionable to cause presentation of the set of media content items on a client device of the viewer; and
    in response to determining that the collection was previously accessed by the viewer, generating a second collections user interface including a second cell representing the collection, the second cell comprising the user-selectable element representing the proposed action.

11. The system of claim 10, wherein the subtext trigger is a caption included with an item in the set of media content items and the context string represents the caption.

12. The system of claim 10, wherein the subtext trigger indicates state of the client device.

13. The system of claim 10, wherein the subtext trigger indicates an augmented reality component and the context string represents an identification of the augmented reality component.

14. The system of claim 10, wherein the subtext trigger is an interactive tool included in an item from the set of media content items.

15. The system of claim 14, wherein the user-selectable element representing the action is actionable to activate the interactive tool.

16. The system of claim 10, wherein the first cell comprises a thumbnail of an image from the set of media content items and an indication of a remaining time period, within which the viewer can access the collection, the indication of the remaining time period is displayed as a partial ring around the thumbnail.

17. The system of claim 16, wherein the image is associated with a content item in the set of media content items that was most recently added to the collection.

18. A machine-readable non-transitory storage medium having instruction data executable by a machine to cause the machine to perform operations comprising:

in a messaging system for exchanging data over a network, accessing a collection created by a user in the messaging system, the collection comprising a set of media content items, the collection configured to cause displaying items in the set of media content items one after another, each for a predetermined period of time;

determining a subtext trigger associated with the collection, the subtext trigger being distinct from items from the set of media content items and distinct from information identifying the user, the subtext trigger associated with a proposed action for a viewer;

based on the determined subtext trigger, generating a context string representing the subtext trigger and a user-selectable element representing the proposed action;

generating a first collections user interface including a first cell representing the collection, the first cell comprising the context string, the first cell actionable to cause presentation of the set of media content items on a client device of the viewer; and in response to determining that the collection was previously accessed by the viewer, generating a second collections user interface including a second cell representing the collection, the second cell comprising the user-selectable element representing the proposed action.

\* \* \* \* \*